US00RE47040E

(19) United States
(12) Reissued Patent
Hynes

(10) Patent Number: US RE47,040 E
(45) Date of Reissued Patent: Sep. 18, 2018

(54) BLACK WINE RACK FACE

(71) Applicant: VINOTEMP INTERNATIONAL CORPORATION, Rancho Dominguez, CA (US)

(72) Inventor: India Hynes, Newport Beach, CA (US)

(73) Assignee: Vinotemp International Corporation, Irvine, CA (US)

(21) Appl. No.: 29/528,194

(22) Filed: Aug. 25, 2015

Related U.S. Patent Documents

Reissue of:
(64) Patent No.: Des. 711,936
Issued: Aug. 26, 2014
Appl. No.: 29/445,271
Filed: Feb. 8, 2013

(51) LOC (11) Cl. ..... 15-07
(52) U.S. Cl.
USPC ..... D15/89
(58) Field of Classification Search
USPC ..... D15/79, 81, 83–89; D25/119; D3/304, D3/313, 315; D6/336, 406.1, 406.3, 510;
(Continued)

(56) References Cited

U.S. PATENT DOCUMENTS

D238,536 S 1/1976 Scherzer
D284,630 S * 7/1986 Ferdinand ..... D6/511
(Continued)

OTHER PUBLICATIONS

US District Court, Southern District of New York, Complaint, *Wine Enthusiast, Inc.*, vs. *Vinotemp International Corporation*, dated Sep. 6, 2017, in 19 pages.

*Primary Examiner* — Darlington Ly

(74) *Attorney, Agent, or Firm* — Knobbe, Martens, Olson & Bear, LLP

(57) CLAIM

The ornamental design for a black wine rack face, as shown and described.

DESCRIPTION

[FIG. 1 is a top perspective view of a black wine rack face within a wine cabinet showing my new design;]
[FIG. 2 is is a top perspective view of a black wine rack face standing alone showing my new design]
[FIG. 3 is a front view thereof; FIG. 3 is a top view of the black wine rack face of FIG. 1;]
[FIG. 4 is a rear view of the black wine rack face of FIG. 1;]
[FIG. 5 is a left side view thereof, the right side being a mirror image thereof;]
[FIG. 6 is a top plan view thereof; and,]
[FIG. 7 is a bottom plan view thereof.]
[Elements shown in dashed, dotted or broken lines form no part of the design.]
*FIG. 8 is a top perspective view of a black wine rack face within a wine cabinet showing my new design;*
*FIG. 9 is a top perspective view of a black wine rack face standing alone showing my new design;*
*FIG. 10 is a front view thereof;*
*FIG. 11 is a rear view thereof;*
*FIG. 12 is a left side view thereof, the right side being a mirror image thereof;*
*FIG. 13 is a top plan view thereof; and,*
*FIG. 14 is a bottom plan view thereof.*
*The broken lines illustrate environmental structure of a wine rack and portions of a wine race face thereto that do not form part of the claimed design. The diagonal cross-hatched lines are provided to represent the solid color black.*

1 Claim, 6 Drawing Sheets

Figure 1:
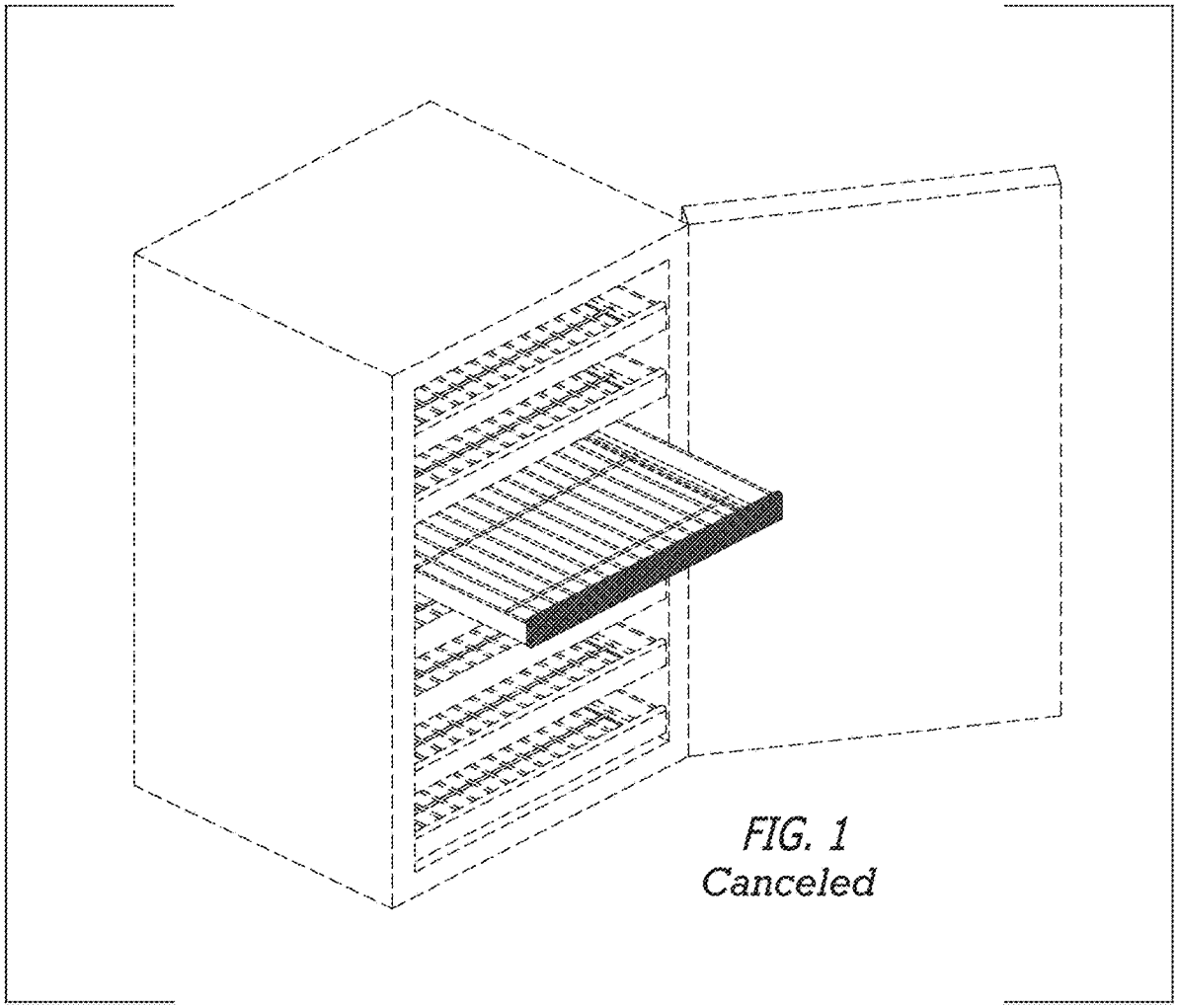
Figure 2:
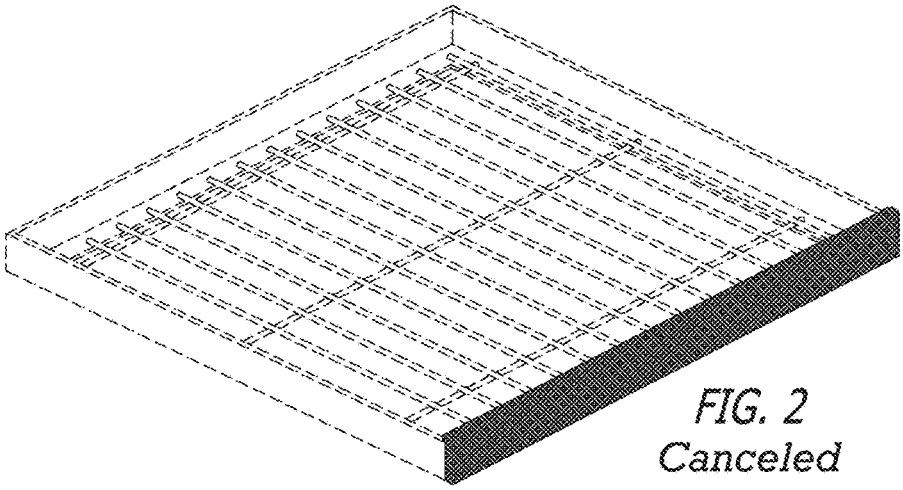
Figure 3:
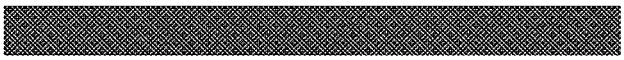
Figure 4:
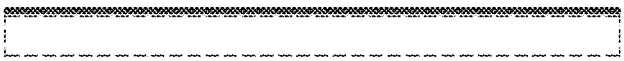
Figure 5:
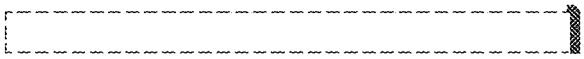
Figure 6:
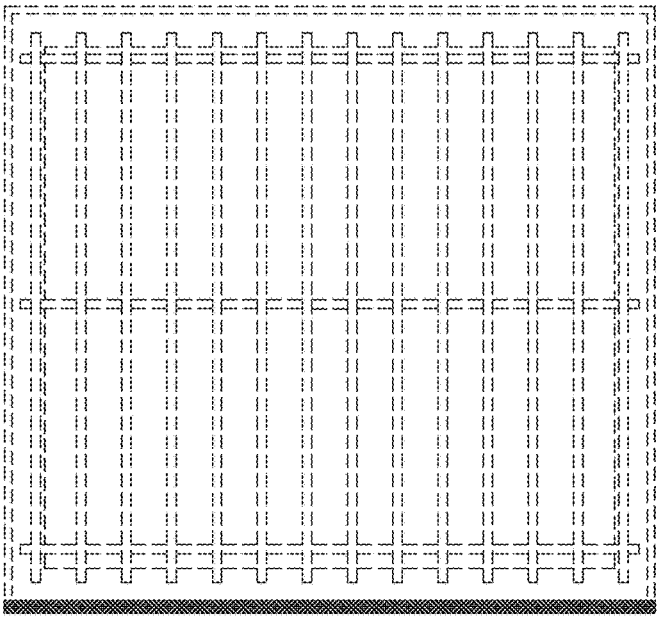
Figure 7:
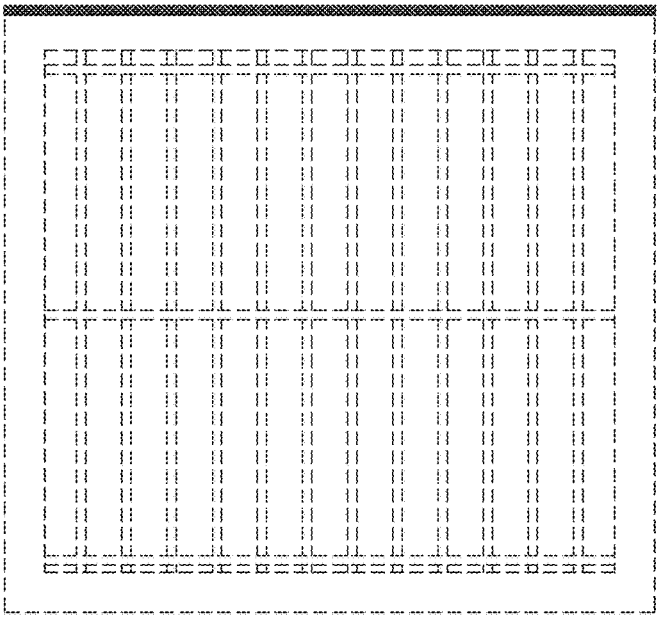

Matter enclosed in heavy brackets [ ] appears in the original patent but forms no part of this reissue; matter printed in italics indicates the additions made by reissue.

(58) Field of Classification Search
USPC ..... D7/510, 511, 549, 550.1, 552.1, D7/553.1–553.4, 555, 600.1–600.4, D7/701–708
CPC ..... A47B 55/02; A47B 73/002; A47B 73/008; F25D 25/02; F25D 25/024; F25D 31/007
See application file for complete search history.

(56) References Cited

U.S. PATENT DOCUMENTS

| | | | | | |
|---|---|---|---|---|---|
| D382,735 | S | * | 8/1997 | Zapf | D6/492 |
| D415,482 | S | * | 10/1999 | Jolson | D14/447 |
| D475,374 | S | * | 6/2003 | Segers | D15/89 |
| D478,601 | S | * | 8/2003 | Becke | D15/81 |
| D511,013 | S | * | 10/2005 | Bullock, Jr. | D25/119 |
| D512,081 | S | * | 11/2005 | Chang | D15/81 |
| D519,133 | S | * | 4/2006 | Chang | D15/81 |
| D524,830 | S | * | 7/2006 | Lei et al. | D15/81 |
| D529,630 | S | * | 10/2006 | Zarb | D25/119 |
| 7,165,371 | B2 | * | 1/2007 | Yoyasu | 52/716.5 |
| D550,256 | S | * | 9/2007 | Lei et al. | D15/81 |
| D551,262 | S | * | 9/2007 | Becke | D15/89 |
| D566,490 | S | | 4/2008 | Frentzel | |
| D576,023 | S | * | 9/2008 | Urmson, Jr. | D8/382 |
| D595,357 | S | * | 6/2009 | Simpson | D19/88 |
| D607,242 | S | * | 1/2010 | Clausen | D6/707.24 |
| D618,932 | S | * | 7/2010 | Linder | D6/675.1 |
| D625,941 | S | * | 10/2010 | Holzer | D6/510 |
| D627,374 | S | * | 11/2010 | Yang | D15/81 |
| D630,230 | S | * | 1/2011 | Yang | D15/81 |
| D630,231 | S | * | 1/2011 | Yang et al. | D15/81 |
| D638,237 | S | * | 5/2011 | Holzer | D6/510 |
| D639,827 | S | * | 6/2011 | Chen | D15/81 |
| D660,327 | S | * | 5/2012 | Doberstein et al. | D15/89 |
| D660,461 | S | * | 5/2012 | Kotin et al. | D25/119 |
| D660,984 | S | * | 5/2012 | Kotin et al. | D25/119 |
| D664,149 | S | * | 7/2012 | Crisp | D14/459 |
| D672,174 | S | * | 12/2012 | Artus | D6/705 |
| D684,400 | S | * | 6/2013 | Gasser | D6/705.5 |
| D694,290 | S | | 11/2013 | Hottmann et al. | |
| D698,372 | S | * | 1/2014 | Brenneis | D15/81 |
| D700,221 | S | * | 2/2014 | Ringemann et al. | D15/89 |
| D717,080 | S | * | 11/2014 | Dworman | D6/657 |
| D719,987 | S | * | 12/2014 | Lee | D15/89 |
| D723,593 | S | * | 3/2015 | Ryu | D15/89 |
| D726,455 | S | * | 4/2015 | Collini | D6/661 |
| 9,028,020 | B2 | * | 5/2015 | Gossens | A47B 73/00 312/408 |
| D736,751 | S | * | 8/2015 | Lee | D14/248 |
| 9,211,009 | B2 | * | 12/2015 | Greenwood | A47B 88/18 |
| D747,836 | S | * | 1/2016 | Cho | D32/6 |
| 2003/0117051 | A1 | * | 6/2003 | Kweon | A47B 96/025 312/408 |
| 2005/0258118 | A1 | * | 11/2005 | Lee et al. | 211/134 |
| 2007/0096607 | A1 | * | 5/2007 | Ricchetti | A47B 63/00 312/184 |
| 2007/0228909 | A1 | * | 10/2007 | Hwang et al. | 312/408 |
| 2008/0061665 | A1 | * | 3/2008 | Lautenschlager | A47B 88/0014 312/333 |

* cited by examiner

Canceled

Canceled

Canceled

Canceled

Canceled

Canceled

Canceled

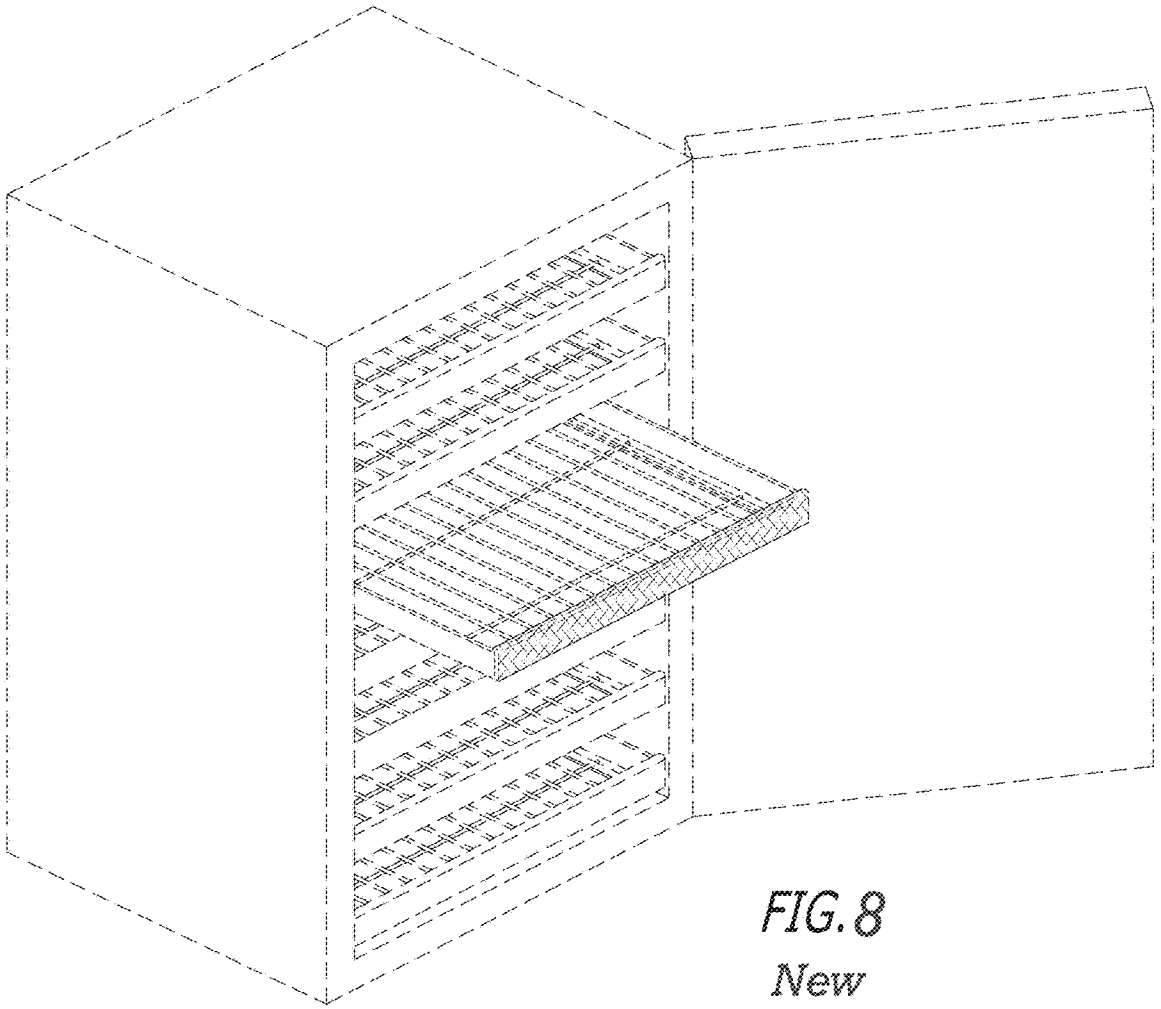
FIG. 8
New

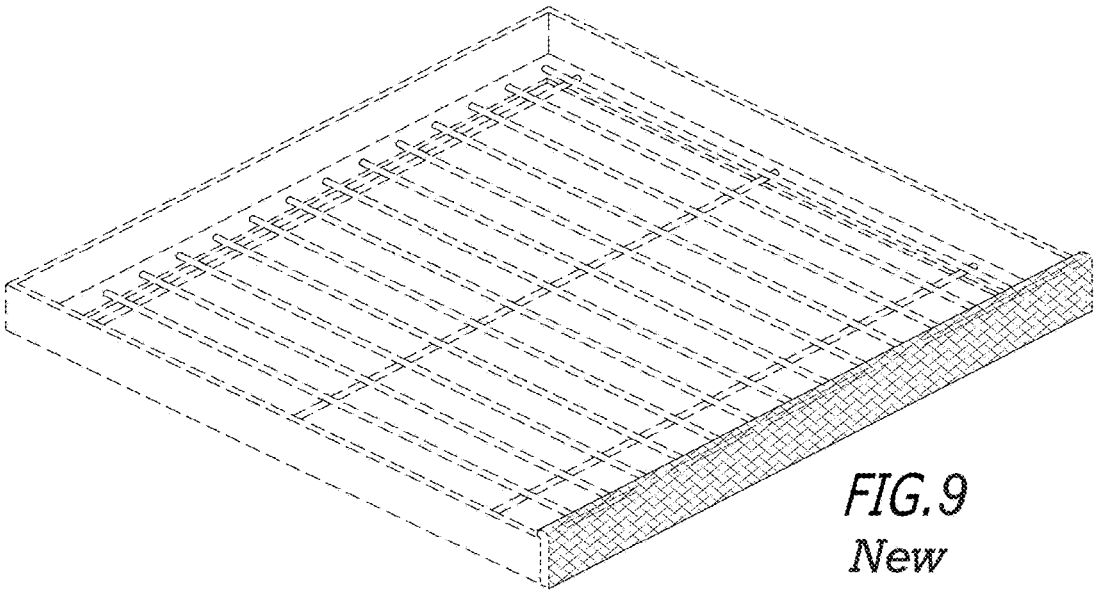
FIG.9
New
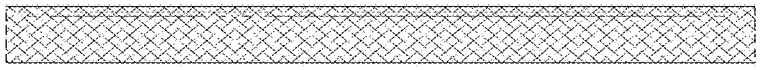
FIG.10
New
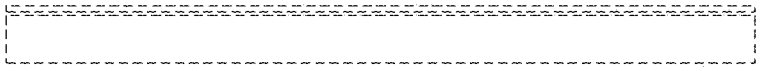
FIG.11
New
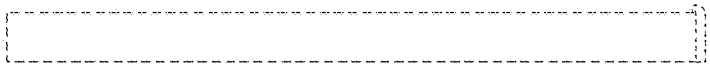
FIG.12
New

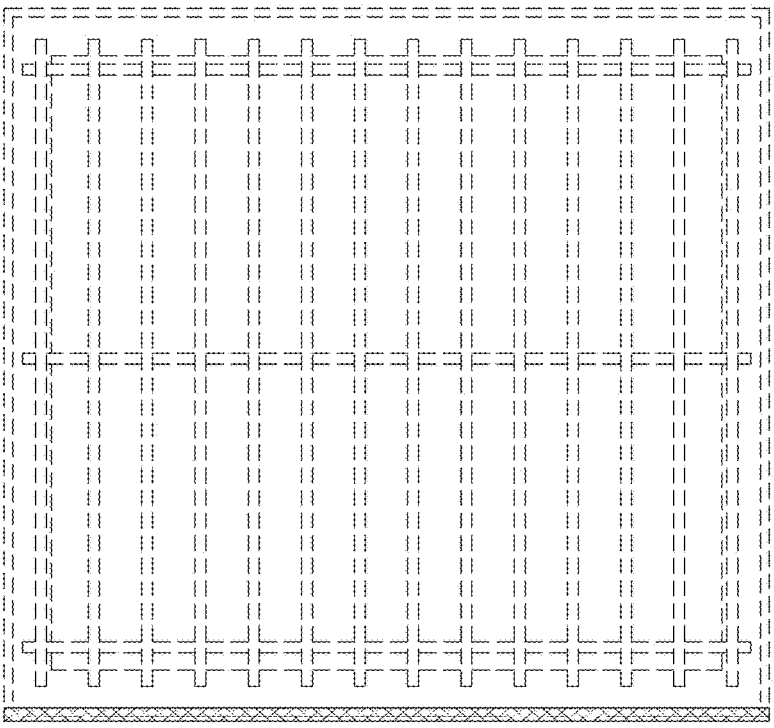
FIG. 13
New
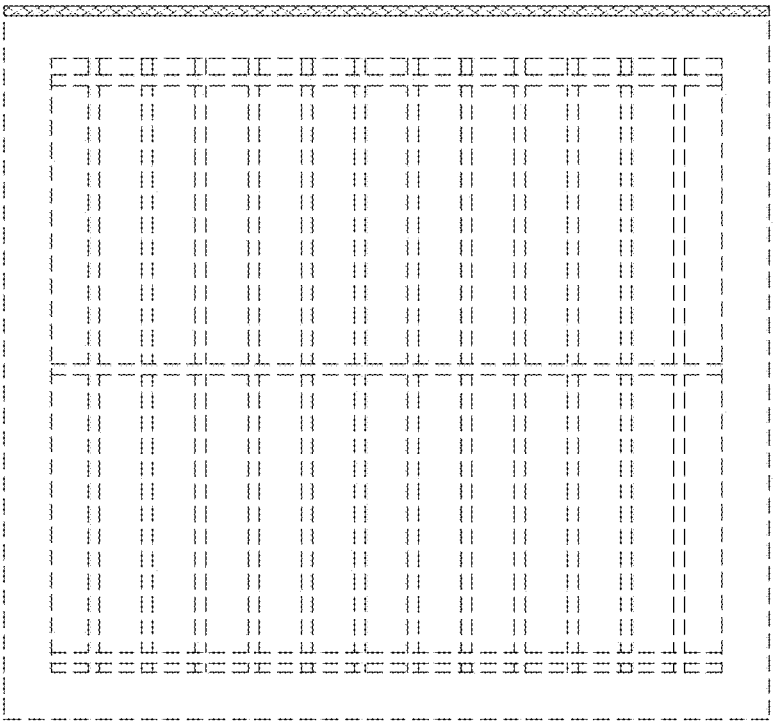
FIG.14
New